United States Patent

[11] 3,609,537

| [72] | Inventors | Albert M. Healy<br>Essex Center;<br>Donald M. Kenney, Shelburne, both of Vt. |
|---|---|---|
| [21] | Appl. No. | 811,933 |
| [22] | Filed | Apr. 1, 1969 |
| [45] | Patented | Sept. 28, 1971 |
| [73] | Assignee | International Business Machines Corporation<br>Armonk, N.Y. |

[54] RESISTANCE STANDARD
11 Claims, 4 Drawing Figs.

[52] U.S. Cl. .................................................. 324/64,
324/74, 324/158 R
[51] Int. Cl. ..................................................... G01r 27/14,
G01r 1/02
[50] Field of Search ........................................... 324/64,
158, 158 D, 158 P, 158 F, 74; 338/204, 306, 307,
308, 309, 314

[56] References Cited
UNITED STATES PATENTS
| 3,381,255 | 4/1968 | Youmans ..................... | 338/308 |
| 3,416,078 | 12/1968 | Boncuk et al. ................ | 324/64 |

*Primary Examiner*—Rudolph V. Rolinec
*Assistant Examiner*—Ernest F. Karlsen
*Attorneys*—Hanifin and Jancin and Willis E. Higgins ABSTRACT: A resistance standard for calibrating four-point probes used to measure resistances of semiconductor material has a metal pattern having an area of known resistance value deposited on the surface of a semiconductor wafer. Four diffused areas of opposite conductivity to the remainder of the wafer are disposed adjacent to and are electrically connected to the area of known resistance value. One point of the probe is contacted to each of the diffused areas to connect the probe to the standard. A constant current is passed through the area of known resistance and the voltage drop across the area measured. This standard is both stable and allows probe to semiconductor contact experienced in actual measurements to be duplicated during calibration of the probe.

PATENTED SEP28 1971 3,609,537

INVENTORS
ALBERT M. HEALY
DONALD M. KENNEY
BY Willis E. Higgins
ATTORNEY

RESISTANCE STANDARD

FIELD OF THE INVENTION

This invention relates to a standard and method of calibration for probes used to measure semiconductor resistances. More particularly, it relates to a standard and to a method of calibration for four-point probes used to measure the resistance, and hence, the level of impurity diffusion carried out in semiconductor manufacturing processes.

In the fabrication of integrated circuits, different electrical properties are obtained in semiconductor material by the selective diffusion of impurities such as boron, aluminum, phosphorus, or arsenic in small amounts into small areas on a semiconductor wafer. For example, Agusta et al., application Ser. No. 539,210, filed Mar. 31, 1966, entitled "Monolithic Integrated Structure Including Fabrication and Package Therefor," assigned to the same assignee as the present application, discloses such a process in which many such small areas are diffused simultaneously through openings in a silicon dioxide protective layer overlying a silicon wafer. As many as several hundred such openings may be found in an area measuring only 0.06 inches by 0.06. inches. An array of 100 or more of such areas in a semiconductor wafer, which will subsequently be diced into individual chips, is diffused simultaneously in a wafer. In turn, 100 or more such wafers may be diffused at one time in a batch process.

Diffusing such a quantity of very small areas in so many semiconductor chips simultaneously requires extremely close process control. As check on a particular diffusion, a wafer having no overlying silicon dioxide protective layer but otherwise identical to the actual product wafers undergoing diffusion is placed in the diffusion deposition chamber. When this wafer has been diffused to the proper depth and concentration level, it indicates that diffusion of the vast number of very small areas in the product wafers has been carried out to the proper depth at the proper concentration. The resistance of this blank wafer, called a test wafer, is measured to allow determination of whether the diffusion has been carried out to the proper depth and concentration. Obviously, a very precise measurement of its resistance is required. In practice, the test wafer is measured at a number of locations on its surface, and an average value of the resistance taken. Similarly, this test wafer accompanies the actual product wafers through the subsequent reoxidation and drive-in of the diffused impurities. After reoxidation and drive-in, the resistance of the test wafer is again measured, since its impurity profile will change correspondingly to the profile change in the product wafers.

Four-point probes have been found to give the most reliable resistance measurements. As used herein, the term "four-point probe" refers to the electronics of the instrument as well as the actual four probes which make contact with the material to be measured. In the use of a four-point probe, a constant current is passed between two of the probe points, and the voltage drop across a predetermined distance through a resistive material is determined by connecting a voltmeter between the other two probe points. The precision and accuracy of resistance measurements made by these probes is determined largely by the precision and accuracy of their calibration.

In integrated circuit manufacture, one approach to four-point probe calibration is to use one of the test wafers from a previous diffusion. Based on integrated circuit device characteristics obtained from that run as well as the resistance measurements of that test wafer, its actual resistance within an accuracy of 2 percent or better is known. When calibrated with such a test wafer, the four-point probe may then be used for measuring the resistance of subsequent test wafers.

This procedure is highly satisfactory for large-scale variations in resistance. However, it is very difficult, if not impossible, to detect a very slow drift in resistance caused by slight process variations over an extended period of time in this manner. Also, such test wafers are very sensitive to temperature and humidity changes. This sensitivity is a particular problem when it is desired to compare resistance measurements at different manufacturing locations. The only satisfactory procedure for probe calibration at different locations using such test wafers has been a complex, time consuming, roundrobin testing procedure. Another problem associated with the use of a test wafer from a previous diffusion for calibration arises from the fact that the resistance of the test wafers varies at different locations on its surface. In order to obtain a valid resistance measurement on such a test wafer, it is necessary that the probe points contact previously uncontacted points on the wafer. Therefore, when such a test wafer is used for probe calibration purposes, the probe may appear to be out of calibration, when in fact the resistance of the particular region being measured is different.

DESCRIPTION OF THE PRIOR ART

A possible approach to four-point probe calibration is to use a metallic resistance standard of the type described in U.S. Pat. No. 3,374,430. Such a standard provides a calibration for the electronics of four-point probes, but is incapable of revealing whether the conduction characteristics of the probe contacts with semiconductor material have changed, since use conditions of the probe contacts are not duplicated. In fact, the use of such a resistance standard will itself alter the conduction characteristics of the probe points for measuring resistances of semiconductor materials due to the retention of minute amounts of metal on the probe points. These minute amounts of metallic contaminants are a problem, since their presence on the test wafer would introduce them as contaminants on the product wafers during a subsequent reoxidation and drive-in step. Also, the presence of such metals on the probe tips in contact with a semiconductor will produce spurious currents.

Thus, to calibrate a four-point probe, the present choice is either to use a previous semiconductor test wafer, the resistance of which is likely to change with time, or to use a metallic resistance standard, which is not subject to change, but which is likely to contaminate the product wafers during subsequent process steps or alter the conducting characteristics of the probe points. A need therefore exists for an improved standard to calibrate four-point probes used in measuring resistances of semiconductors.

SUMMARY OF THE INVENTION

Accordingly, it is an object of this invention to provide a stable standard for calibrating a semiconductor resistance-measuring probe which does not introduce metallic contaminants on the probes.

It is a further object of the invention to provide a stable resistance standard for calibrating a semiconductor resistance-measuring probe which does not cause the introduction of contaminants to the semiconductor measured with the probe.

It is another object of the invention to provide a stable standard for calibrating a probe used to measure resistances in semiconductors which duplicates probe-to-semiconductor contact experience in use of the probes.

It is yet another object of the invention to provide a standard for calibrating a semiconductor resistance-measuring probe which duplicates semiconductor-probe contact but does not vary in resistance value as different portions of the standard are contacted.

These and other related objects may be attained by using the resistance standard for calibrating semiconductor measuring probes herein disclosed. A plurality of electrically isolated semiconductor areas are provided, each adapted to be separately contacted by the points of the probe. The standard is desirably incorporated on, but insulated from, a semiconductor substrate of a given conductivity type with the isolated semiconductor areas being of opposite conductivity type to the semiconductor substrate. The spacing and dimensions of these areas are such that the probe points contact the contact areas simultaneously with each one of the probe points contacting a different one of the areas. Finally, a resistor of known value is electrically connected to the isolated areas. The resistor is preferably made of a material which is stable when exposed to variations in temperature, humidity, and other ambient conditions. It is desirably a metallic film resistor deposited on the semiconductor substrate and joined to each of the isolated areas by metallic conducting lines.

Resistance standards of this type may be used in a novel method for calibrating a multiple point probe used to measure resistance in a semiconductor. A resistor of a known value within the range of resistance to be measured by the probe is electrically connected to areas of semiconductor material also having a resistance within the range of resistance to be measured by the probe. The probe points are then contacted to the areas of semiconductor material, preferably in a previously uncontacted portion of each of the areas, for best duplication of the actual semiconductor-to-probe contact experienced in measurements. A constant current is passed through the resistor from the probe. A reading of the voltage drop across the resistor is then obtained with the probe. To complete the calibration, this reading of voltage drop is adjusted to correspond to that which should be obtained across the known resistor with the known current.

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Figure 1:
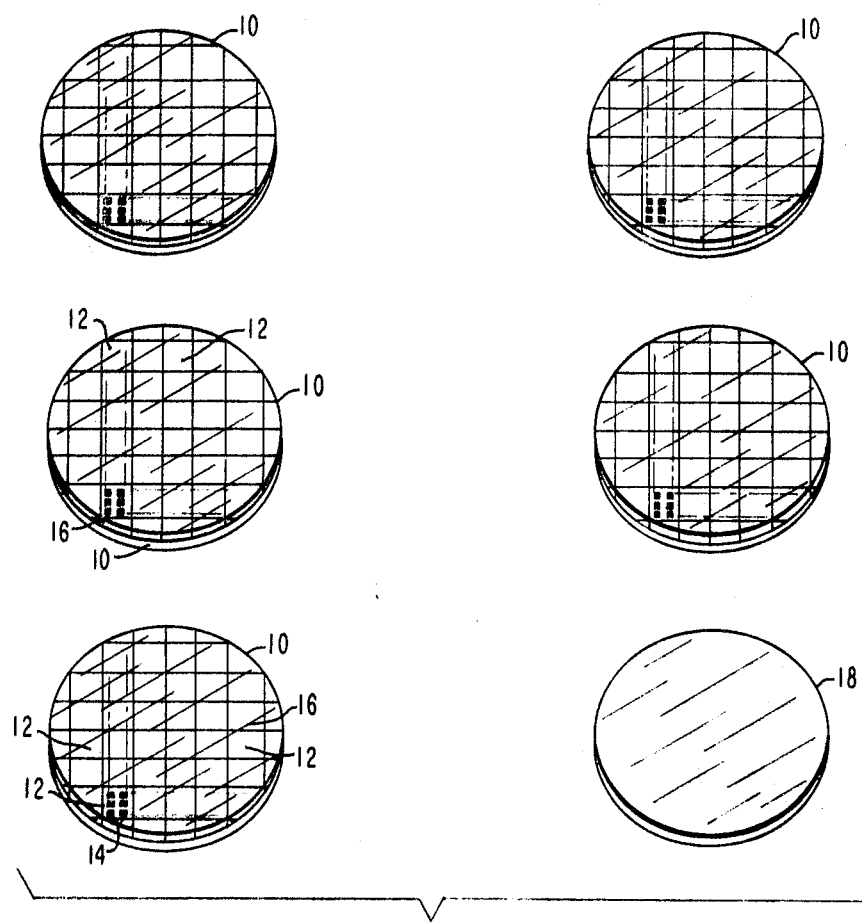
FIG. 1 represents a number of wafers containing an array of diffused integrated circuit devices together with a diffusion test wafer, the resistance of which is measured to control the diffusion process.

Referring now to the drawings, more particularly to FIG. 1, there is shown a number of wafers made by a diffusion process, the completion of which may be monitored by resistance measurements. Semiconductor wafers 10 are shown each divided into an array of chips 12. For convenience, only a limited number of chips 12 are shown in the array. It should be recognized that each wafer 10, which may have a diameter of 1¼ inches, is usually divided into 100 or more chips 12. Each of the chips has a number of small areas 14 into which an impurity, such as boron, aluminum, phosphorus, or arsenic, is diffused to alter the electrical characteristics of the semiconductor material in the wafer at the areas 14. The remaining areas of each of the wafers 10 are covered with a masking layer 16 of, e.g., silicon dioxide to prevent the impurities from diffusing into other areas of the wafers than the areas 14. For ease of illustration, only a limited number of the areas 14 have been shown. It should be recognized, however, that each chip 12 may contain 100 or more of the areas 14 into which a precisely controlled diffusion is to be carried out.

Test wafer 18 differs from the product wafers 10 in that it is not divided into an array of chips 12, nor does it contain a masking layer 16 of silicon dioxide. It is the measurement of the resistance of wafer 18 by a four-point probe which is used to control the diffusion process. When wafer 18 has a value within a predetermined range, this is an indication that the deposition of diffusion impurities into the areas 14 on wafers 10 has been properly completed.

At this point, the silicon dioxide layer 16 shown on the product wafers 10 is stripped with a suitable etchant. The product wafers then undergo a reoxidation step to prepare a new silicon dioxide layer for a subsequent diffusion. This reoxidation step also serves to drive in the impurity already deposited deeper into the wafers 10, thus changing the impurity profile. This drive-in must also be controlled very carefully to give the proper characteristics to the integrated circuit devices. The test wafer 18 therefore also accompanies the product wafers 10 in the reoxidation and drive-in step. The silicon dioxide layer introduced on test wafer 18 during this step is then stripped with an etchant, and the resistance of test wafer 18 is again measured.

Figure 2:
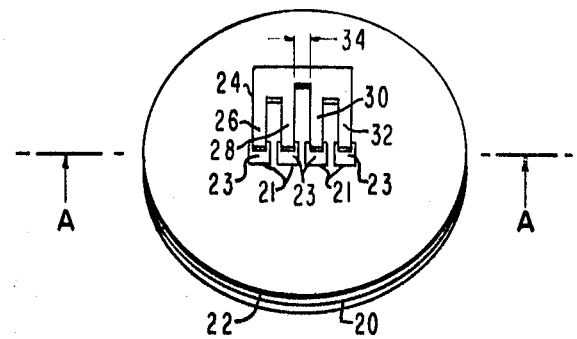
FIG. 2 shows an embodiment of the claimed resistance standard.
Figure 3:
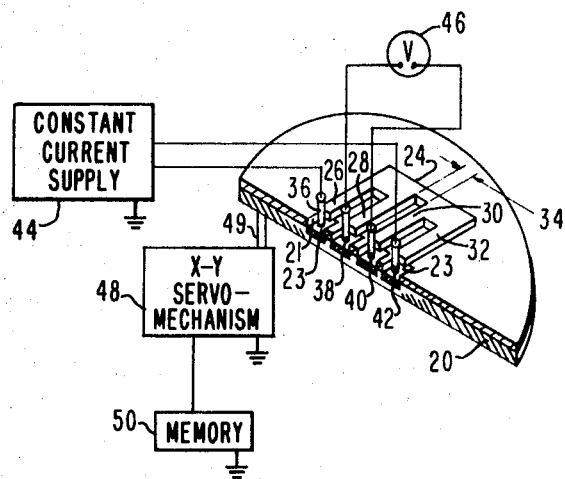
FIG. 3 is a perspective view of the resistance standard shown in FIG. 2, with a section taken along the line A—A in FIG. 2, and also showing the placement of a four-point probe on the standard.
Figure 4:
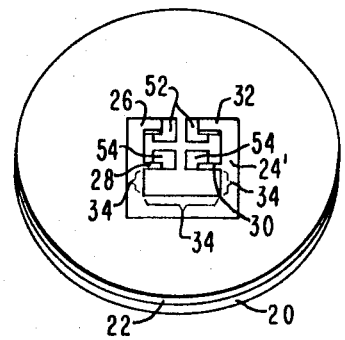
FIG. 4 shows another embodiment of the standard, for use with another type of four-point probe.

The ability to control the diffusion process both at the deposition step and the drive-in step within desired tolerances is dependent on the ability to measure the resistance of test wafer 18 with a high degree of accuracy. The resistance standard of this invention, shown in FIGS. 2–4, is used to assure that the four-point probes used to measure the resistance of wafer 18 are properly calibrated. The standard comprises a silicon wafer 20 into which boron or other acceptor impurity has been introduced during crystal growth or diffused to produce a $p$-type silicon substrate. It should be recognized that phosphorus or other donor impurity may also be introduced to give $n$-type silicon in the wafer 20. Both types of silicon would ordinarily be used to produce the standards, since both $p$-type and $n$-type test wafers 18 would be measured with a four-point probe during the fabrication of an integrated circuit device. For the purposes of the following discussion, it will be assumed that wafer 20 is $p$-type silicon. The selective diffusion of phosphorous or other donor impurity into the wafer 20 through openings 21 in silicon dioxide or other dielectric layer 22 produces four $n$-type areas 23 in the surrounding $p$-type silicon wafer 20. If wafer 20 were $n$-type silicon, the four areas 23 would be $p$-type silicon. A metallic network 24, preferably aluminum or molybdenum, is deposited by vacuum evaporation or other suitable techniques on the surface of dielectric layer 22 and includes conducting lines 26, 28, 30, and 32 serving to connect area 34 of the metallic network to each of the $n$-type areas 23.

Only the dimensions of the area 34 of the metallic network 24 need to be precisely established in order to give a known value of resistance. It is this known resistance value which is used to calibrate a four-point probe.

FIG. 3 shows how a four-point probe is connected to the resistance standard for calibration. As shown, the four probe points 36, 38, 40, and 42 each contact one of the $n$-type diffused areas 23 on wafer 20.

A constant current is passed from current supply 44 through the area 34 of known resistance by way of probe points 36 and 42 and legs 26 and 32 of the metallic network 24. The voltage drop across the area 34 of known resistance is measured by a high impedance voltmeter 46 through probe points 38 and 40. Since there is little or no current flow in legs 28 and 30 of the metallic network 24, the voltage drop seen by voltmeter 46 is across the area 34 of known resistance.

The resistance of the area 34 should be within the range of resistances of the wafers to be measured by the calibrated probe, preferably as close to the middle of the range as possible. Similarly, for best simulation of the probe-to-semiconductor contact experienced in actual measurement, the four $n$-type conductivity areas 23 on wafer 20 should also have a resistance within the range to be measured by the four-point probe in use.

Each time the probe contacts the semiconductor material, it changes the electrical characteristics of the semiconductor material at the contact point. Therefore, if a probe point subsequently contacts the same place again, rigorous duplication of the metal-to-semiconductor contact obtained when using the four-point probe for measuring purposes is not made. Therefore, it is preferred to provide a suitable X–Y servomechanism 48 for moving the wafer 20, by a suitable coupling 49, with respect to the probe points 36, 38, 40, and 42 between calibrations using the standard. This will insure that the probe points will contact a previously uncontacted place of the areas 23 on wafer 20. A suitable memory 50 may also be provided to record the places of areas 23 which probe points 36, 38, 40, and 42 have previously contacted.

The standard shown in FIGS. 2 and 3 has areas 23 adapted to receive probe points 36, 38, 40, and 42 in a linear arrangement. The location of these areas may be altered to contact four-point probes arranged in other configurations. FIG. 4 shows such a modification adapted to receive probes in a square configuration. Areas 52 of opposite conductivity in semiconductor wafer 20 are arranged to receive probe points 36 and 42 of a four-point probe which provide the constant current. Areas 54 receive the probe points 38 and 40 connected to a suitable voltmeter for measuring the voltage drop across area 34 of a metallic pattern 24'.

It should now be apparent that an improved resistance standard and a process for calibrating four-point probes used to measure resistances in semiconductors capable of carrying out the stated objects has been provided. Use of the resistance standard and process herein disclosed provides the advantages of a stable resistance standard and also duplicates the semiconductor-to-metal contact obtained when the four-point probe is used for actual measurement of a semiconductor resistance. The disclosed standard is both unaffected by normal ambient temperature or humidity changes and provides a constant resistance value when contacted at different points within the contact areas.

Although a four-point probe has been described and shown, modifications of the standard to accept probes having a different number of points may be made.

While the invention has been particularly shown and described with reference to preferred embodiments thereof, it will be understood by those skilled in the art that various changes in form and details may be made therein without departing from the spirit and scope of the invention.

What is claimed is:
1. In combination,
A. A standard for calibrating a multiple point probe comprising:
 1. a plurality of electrically isolated semiconductor areas each adapted to be contracted by one of the points of the probe, and
 2. a resistor of known resistance value made of electrically stable material electrically connected between two of the isolated areas,
B. two points of the multiple point probe to be calibrated each connected to one of the two isolated areas between which the resistor is connected,
C. means for supplying a constant current through said resistor connected to the two points of the multiple point probe, and
D. means for measuring a resultant voltage across the resistor.
2. The combination of claim 1 additionally comprising:
E. means operatively engageable to alter the relative position of the areas and the probe points to position a previously uncontacted place in each of the areas beneath the probe points.
3. The combination of claim 1 in which the probe is a four-point probe, there are four electrically isolated areas of semiconductor material adapted to be contacted by the four probe points, and the resistor is of a value within the range of resistances to be measured by the probe.
4. In combination,
A. A standard for calibrating a four-point probe comprising:
 1. a semiconductor substrate of a given conductivity type,
 2. four discrete areas in the substrate of opposite conductivity type each adapted to be contracted by one of the four points of the probe, and
 3. a resistor of known value contained within a metal pattern on an insulated surface of the semiconductor substrate and electrically connected to the four areas to allow two circuit paths to be completed, each through two of the areas with the resistor between the two of the areas in each circuit,
B. two points of the four point probe connected to two of the areas to complete one of the circuit paths,
C. a constant current source connected to said two points of the four-point probe,
D. the other two points of the four-point probe connected to the other two areas to complete the other of the two circuit paths, and
E. means for measuring a resultant voltage drop across the resistor connected to said other two points of the four-point probe.
5. The combination of claim 4 in which the semiconductor substrate is $p$-type silicon and the four areas are $n$-type silicon.
6. The combination of claim 4 in which the semiconductor substrate is $n$-type silicon and the four areas are $p$-type silicon.
7. The combination of claim 4 in which the standard additionally comprises:
 4. drive means operatively connected to the standard for positioning a previously unconnected portion of the four areas beneath the four points of the probe each time the standard is used.
8. The combination of claim 7 in which the semiconductor substrate is $p$-type silicon and the four areas are $n$-type silicon.
9. The combination of claim 7 in which the semiconductor substrate is $n$-type silicon and the four areas are $p$-type silicon.
10. A method for calibrating a multiple point probe of the type used to measure resistances within a given range of values in a semiconductor comprising:
a. electrically connecting a metallic resistor having a value within the range between two electrically isolated areas of semiconductor material,
b. contacting each of the two isolated areas of semiconductor material with one of the points of the probe in a previously uncontacted portion of each area,
c. passing a known constant current between the points of the probe contacting the two isolated areas through the resistor,
d. obtaining a reading of the voltage drop across the resistor with the probe, and
e. adjusting the reading of the voltage drop to correspond to the value which should be obtained across the known resistor with the known current.
11. The method of claim 10 in which the multiple point probe is a four-point probe, there are four electrically isolated areas of semiconductor material, the constant current is passed through two of the probe points, and the voltage drop across the resistor is measured between the other two probe points.

PO-1050
(5/69)

UNITED STATES PATENT OFFICE
CERTIFICATE OF CORRECTION

Patent No. 3,609,537   Dated September 28, 1971

Inventor(s)  Albert M. Healy and Donald M. Kenney

It is certified that error appears in the above-identified patent and that said Letters Patent are hereby corrected as shown below:

Column 5, Line 42, delete "contracted" and substitute therefor -- contacted --. Column 6, Line 7, delete "contracted" and substitute therefor -- contacted --.

Signed and sealed this 1st day of August 1972.

(SEAL)
Attest:

EDWARD M.FLETCHER,JR.          ROBERT GOTTSCHALK
Attesting Officer              Commissioner of Patents